United States Patent [19]

Lequime

[11] Patent Number: 4,814,604
[45] Date of Patent: Mar. 21, 1989

[54] OPTO-ELECTRONIC METHOD AND SYSTEM FOR REMOTE DETECTION OF PHYSICAL MAGNITUDES

[75] Inventor: Michel Lequime, Eguilles, France

[73] Assignee: Bertin & Cie, B.P., Plaisir, France

[21] Appl. No.: 127,891

[22] PCT Filed: Mar. 13, 1987

[86] PCT No.: PCT/FR87/00074

§ 371 Date: Nov. 12, 1987

§ 102(e) Date: Nov. 12, 1987

[87] PCT Pub. No.: WO87/05692

PCT Pub. Date: Sep. 24, 1987

[30] Foreign Application Priority Data

Mar. 13, 1986 [FR] France ................. 86 03598

[51] Int. Cl.$^4$ ............... H01J 5/16; G01J 4/00
[52] U.S. Cl. .................. 250/227; 356/367; 356/351; 374/161
[58] Field of Search ............ 374/161, 162; 250/227, 250/225, 226; 356/345, 351, 367, 365, 364, 370

[56] References Cited

U.S. PATENT DOCUMENTS

| 4,111,050 | 9/1978 | Waddoups | 374/161 |
| 4,140,393 | 2/1979 | Cetas | 374/161 |
| 4,493,995 | 1/1985 | Adolfsson et al. | 250/227 |
| 4,536,088 | 8/1985 | Rashleigh et al. | 250/227 |
| 4,629,323 | 12/1986 | Matsumoto | 250/227 |
| 4,632,551 | 12/1986 | Pavlath | 250/227 |
| 4,699,513 | 10/1987 | Brooks et al. | 250/227 |

FOREIGN PATENT DOCUMENTS 2080519 2/1982 United Kingdom ............. 374/161

OTHER PUBLICATIONS

"Optics Letters", vol. 11, No. 8, Aug. 1986, pp. 543–545.

Primary Examiner—David C. Nelms
Assistant Examiner—Michael Messinger
Attorney, Agent, or Firm—Dennison, Meserole, Pollack & Scheiner

[57] ABSTRACT

The optoelectronic method and system provides for remote detection of physical magnitudes by multiplexing and demultiplexing signals from a plurality of sensors. The system utilizes a single source of incoherent light which illuminates via optical fibers a plurality of sensors associated with encoding devices. Periodic modulation on the light transmitted by each sensor is accomplished at a frequency which is characteristic of the sensor in question. Demultiplexing is provided for demodulating the signals from the various sensors by a Fourier transform, and for identifying each signal by its characteristic modulation frequency.

12 Claims, 3 Drawing Sheets

OPTO-ELECTRONIC METHOD AND SYSTEM FOR REMOTE DETECTION OF PHYSICAL MAGNITUDES

BACKGROUND OF THE INVENTION

The invention relates to an opto-electronic method and system for remotely detecting physical magnitudes by means of sensors each of which includes a sensitive element whose spectral transmission varies as a function of the physical magnitude to be measured, said sensors being illuminated by an incoherent light beam and transmitting light signals to spectrum analyzer means.

Since optical fibers have become available, it has become common to use changes in spectral transmission in a medium for the purpose of remotely detecting variation in a physical magnitude such as temperature, chemical composition, magnetic field, etc. ...

In particular, there exist sensors based on thermochromic solutions in which temperature changes give rise to large changes in the absorption spectrum of the sensitive medium. An example of an embodiment of such a sensor is described in the article by M. Breci et. al. entitled "Thermochromic Transducer Optical Fiber Sensor", 2nd International Conference on Optical Fiber Sensors Sept. 5-7 1984.

Sensors also exist based on a semiconductor etalon in which temperature variations in the sensitive medium cause the edge of the absorption band to move. A sensor of this type is described in the article by K. Kyuma, S. Tai, T. Sawada and M. Nunoshita, entitled "Fiber Optic Instrument for Temperature Measurement", IEEE, QE-18, 676, 1982.

There also exist colorimetric type sensors in which variations in the composition of a binary mixture give rise to variations in its tristimulus values. A sensor of this type is described in French Pat. No. 85 08 550 dated June 6, 1985.

Present methods do not make it possible to multiplex information from several identical sensors of the abovementioned type simply on a single optical fiber in which the spectrum carriers used would be all mixed together.

SUMMARY OF THE INVENTION

The aim of the present invention is to provide a simple solution to this problem to enable spectral information using a common light source and thus a common carrier to be multiplexed on a common optical fiber.

To this end, the present invention provides an opto-electronic method of remotely detecting physical magnitudes by means of sensors each including a sensitive element whose spectral transmission varies as a function of a physical magnitude to be measured, the sensors being illuminated by an incoherent light beam, and transmitting light signals to spectrum analyzer means, the method being characterized in encoding the signals from each sensor by superposing periodic or quasi-periodic modulation of its spectrum at a frequency characteristic of the sensor under consideration onto the light transmitted by the sensitive element of each sensor, in transmitting the signals modulated in this way via an optical fiber to the said spectrum analyzer means, in decoding or demultiplexing the signals by performing the Fourier transform optically in order to isolate the signal relating to each sensor, and then in processing this signal in order to obtain the value of the corresponding physical magnitude.

Advantageously, the spectrum modulation encoding is performed in each sensor by means of a two-wave interferometer comprising, for example, a birefringent plate of determined constitution which is associated with the sensitive element of the sensor, with demultiplexing being provided by means of a two-wave interferometer comprising, for example, a birefringent plate identical to the plate of the sensor.

Thus, signals coming from different sensors are multiplexed and demultiplexed in an extremely simple manner by optical means. This method also has the advantage of being capable of being implemented in a completely static manner for each sensor.

According to another characteristic of the invention, the signal resulting from the Fourier transform is recorded for each sensor, and a mathematical operation of the inverse Fourier transform type is performed thereon by digital means.

It is thus possible to have access to the information which is representative of sensor behavior, i.e., to the value of the physical magnitude acting on the sensitive element of the sensor.

According to another characteristic of the invention, the spectrum modulation frequency of a sensor varies as a function of a second physical magnitude different from the magnitude which acts on the sensitive element of the sensor, with the signal as demultiplexed by the Fourier transform making it possible to gain access simultaneously to the values of both of these magnitudes.

In a variant, the sensitive elements of the sensors operate in on/off mode about a predetermined value of the corresponding physical magnitude, and the apparent intensity of the demultiplexed signal from each sensor is recorded in order to deduce the state of the physical magnitude relative to its predetermined value.

The invention also provides an optoelectronic system for remote detection of physical magnitudes, the system comprising a source of incoherent light connected by optical fiber to sensors each including a sensitive element whose spectral transmission varies as a function of a physical magnitude to be measured, said sensors being connected by optical fiber to spectrum analyzer means, the system being characterized in that each sensor includes spectrum modulation encoding means performing periodic or quasi-periodic modulation of the light transmitted by the sensitive element at a frequency which is characteristic of the sensor in question, each sensor being connected to the spectrum analyzer means by an optical fiber which is common to all of the sensors, and in that the spectrum analyzer means comprise a two-wave interferometer optically performing a Fourier transform on the signals received from the sensors in order to distinguish the signal from each sensor by virtue of its characteristic frequency, the system also including detector and processor means for detecting the demultiplexed signals and for processing these signals in order to deduce the values of the detected physical magnitudes.

According to another characteristic of the invention each spectrum modulation encoding means is a two-wave interferometer suitable for introducing a path length difference between the two waves which is characteristic of the corresponding sensor.

Advantageously, each spectrum modulation encoding means includes a birefringent plate of determined constitution placed between crossed or parallel polarizers in the immediate vicinity of the sensitive element of the sensor.

The demultiplexing interferometer then includes a set of birefringent plates each of which is identical to the birefringent plate of a corresponding one of the sensors, together with means for bringing these plates one by one onto the optical axis of the interferometer. The detector means comprise means for recording all of the useful demultiplexed signal relating to each sensor, and the processor means comprise means for digitally performing an inverse Fourier transform applied to the recorded signal.

In a variant, the sensitive elements of the sensors are of the on/off type switching about a predetermined value of the corresponding physical magnitude. In this case, it can be deduced whether the physical magnitude in question is greater than or less than its predetermined value simply by recording the apparent intensity of the demultiplexed signal relating to each sensor.

In general, the invention thus makes it possible to multiplex on a common optical fiber the signals transmitted by a plurality of sensors responsive to a physical magnitude, as well as to demultiplex the signals and to process them in order to obtain the values of at least two physical magnitudes at a plurality of measuring points.

The invention will be better understood, and other details, characteristics and advantages thereof will appear on reading the following explanatory description which is made with reference to the accompanying drawings in which:

DESCRIPTION OF THE PREFERRED EMBODIMENTS

The accompanying drawings are, at least to some extent, definitive in nature, and they therefore accompany the description not only to facilitate understanding thereof, but also to contribute to defining the invention, where appropriate.

Figure 1A:
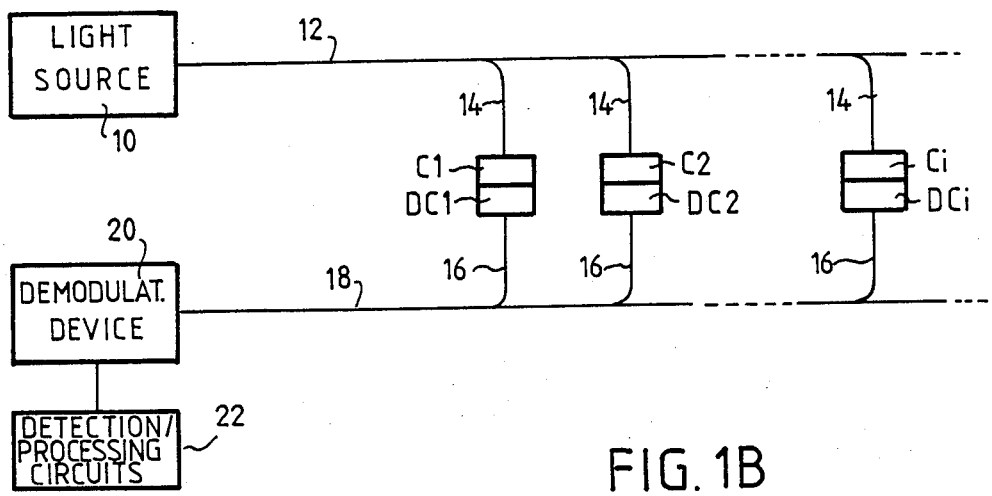
FIG. 1A is a diagram of the system in accordance with the invention.

The system in accordance with the invention is shown diagrammatically in FIG. 1A and comprises a source 10 of incoherent light such as a filament lamp or a light-emitting diode (LED), connected via an emission optical fiber 12 and connection fibers 14 to sensors C1, C2, ... Ci, each of which is associated with an encoding device DC1, DC2, ..., DCi, ... for spectrum modulation encoding of the light transmitted by a corresponding sensor element which is sensitive to a physical magnitude to be measured. The assemblies C1-DC1, C2-DC2, ... are connected by optical connection fibers 16 to a common optical reception fiber 18 which leads to a demodulation device 20 which is associated with circuits 22 for detection and for processing.

Figure 1B:
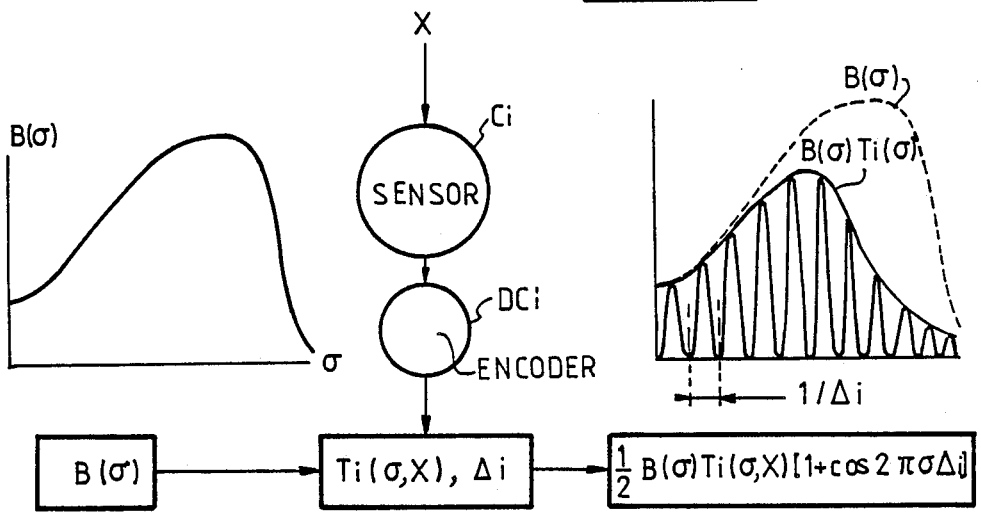
FIG. 1B is a diagram showing the general operating principle of said system.

A sensor and encoding device assembly operates in a manner shown diagrammatically in FIG. 1B. In this figure, $B(\sigma)$ designates the spectrum of the light signal incident at the sensor, where $\sigma$ is the wave number. The sensitive element of sensor Ci is subjected to the physical magnitude X to be measured, for example temperature, and its spectral transmission is designated by $Ti(\sigma,X)$.

The encoding device DCi is a two-wave interferometer system for inserting a path length difference $\Delta i$ between its two waves which is characteristic of the sensor in question.

The sensor transmits a spectrum of envelope $B(\sigma)Ti(\sigma,X)$ representative of the state of the physical magnitude X at the sensor, and a periodic sinusoidal modulation of frequency $\Delta i$ characteristic of the sensor in question is then applied thereto.

The light flux collected by the corresponding optical fiber 16 thus has the following general expression:

$$B'(\sigma,X,i) = \tfrac{1}{2}B(\sigma)Ti(\sigma,X)(1+\cos 2\pi\sigma\Delta i)$$

This light flux is transmitted by the optical fiber 18 to the demodulation device 20 which, by means of a two-wave interferometer, performs a Fourier transform optically on this light flux. The signal obtained in respect of the assembly Ci-DCi is written as follows:

$$\begin{aligned} I(D) &= \tfrac{1}{2}\int B'(\sigma,X,i)[1+\cos 2\pi\sigma D]d\sigma \\ &= \tfrac{1}{4}[\widetilde{BTi}(0) + \widetilde{BTi}(D) + \tfrac{1}{2}\widetilde{BTi}(D-\Delta i) + \tfrac{1}{2}\widetilde{BTi}(D+\Delta i)] \end{aligned}$$

where D is the path length difference in the demodulation interferometer and $\widetilde{BTi}(D)$ is the cosine Fourier transform of $B(\sigma)Ti(\sigma,X)$.

As a result, three space extension responses are obtained which are inversely proportional to the spectrum width of the transmitted flux, and which are centered on the path length differences $0, +\Delta i, -\Delta i$ of each sensor.

Figure 2A:
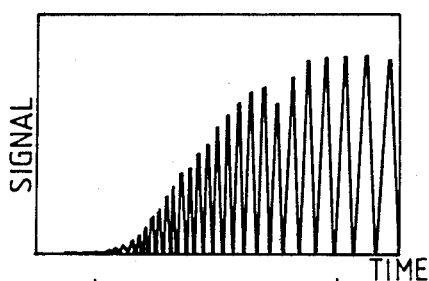
FIGS. 2A, 2B, 2C, and 2D show the role of the modulation frequency used for encoding the signal transmitted by a sensor.
Figure 2C:
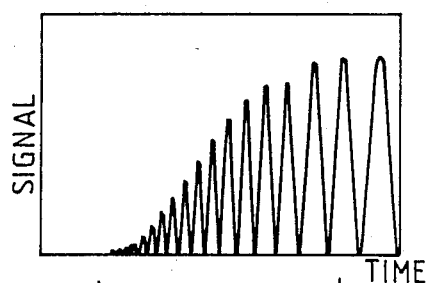
Figure 2B:
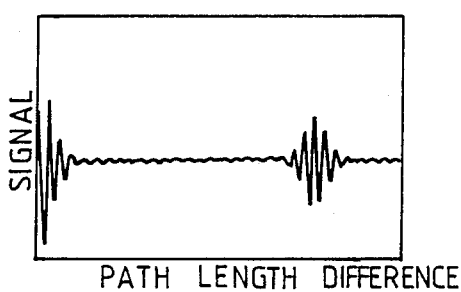
Figure 2D:
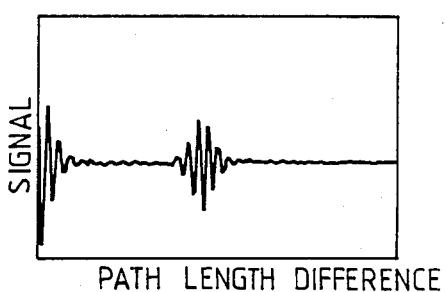

FIGS. 2A, 2B, 2C, and 2D show the influence of the value of the modulation frequency $\Delta i$ on the light flux. FIGS. 2A and 2C are diagrams of an arbitrary light spectrum encoded by two different modulation frequencies. FIGS. 2B and 2D show the signals obtained after demodulation by means of a Fourier transform, with a signal of FIG. 2B corresponding to the flux of FIG. 2A, and a signal of FIG. 2D corresponding to the flux of FIG. 2C. It can be seen, that after Fourier transformation, the lateral responses $+\Delta i$ are not obtained at the same path length difference values D, and can thus easily be identified and isolated insofar as the encoding frequency difference between any two sensors is greater than the spatial extent of the Fourier transform $\widetilde{BT}$ of the flux transmitted by each sensor.

Figure 3A:
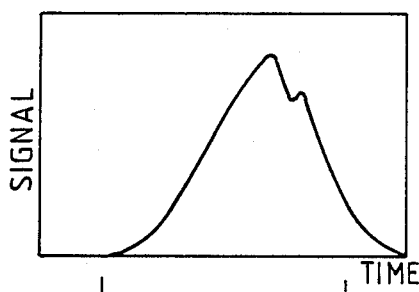
FIGS. 3A, 3B, 3C, and 3D show the relationship between the spectrum transmitted by a sensor and the signal obtained after demodulation.
Figure 3C:
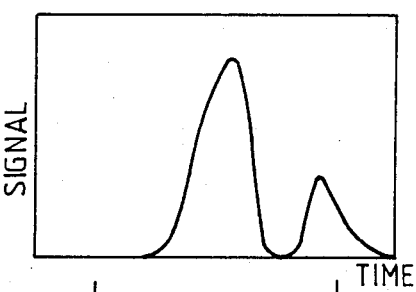
Figure 3B:
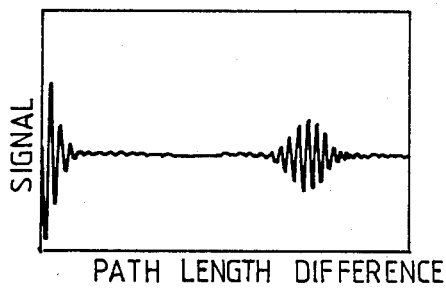
Figure 3D:
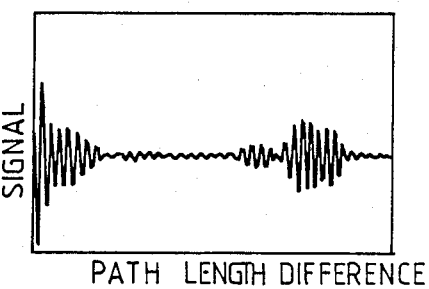

FIGS. 3A, 3B, 3C, and 3D show the influence of variations in the spectral transmission of the sensors on the waveform of the lateral responses $+\Delta i$ as obtained after Fourier transform demodulation. The spectrums transmitted by the sensitive elements of the sensors are shown in FIGS. 3A and 3C, and the corresponding lateral responses $+\Delta i$ are shown in FIGS. 3B and 3D. It can be seen that the information contained in the spectrum transmitted by the sensitive element of a sensor is directly related to the information contained in the demodulated signal, with the relationship being of the Fourier transform type.

As a result, the method and the system in accordance with the system can indeed be used to multiplex spectral information from a plurality of sensors on a common optical line using a common incoherent carrier.

The demultiplexed signals are processed as follows:

The detection means of the circuits 22 record the zones of the interferogram which correspond to the lateral responses $+\Delta i$ relating to the various sensors. For each sensor, the useful signal thus has the form:

$$Si(D) = [\widetilde{BTi}(0) + \tfrac{1}{2}\widetilde{BTi}(D - \Delta i)]$$

In this relationship, the first term corresponds to the direct components of the various sensors being superposed, while the second term is directly related to the behavior of the corresponding sensor Ci.

By appropriate analog or digital processing, e.g., by differential amplification or by AC coupling, or else by digital subtraction, the direct background corresponding to the sum of the first terms in the relationship is removed and only the useful signal, i.e., the second term of this relationship, is digitized.

Thereafter, a digital method is employed (a computer program or a specialized FFT type circuit) to obtain the inverse Fourier transform on the values obtained about the characteristic path length difference $\Delta i$, thereby giving access to information representative of the behavior of the sensor Ci, i.e., $B(\sigma)Ti(\sigma,X)$.

In order to avoid possible drift in the light source 10, it is advantageous to make use of a reference path which is similar in constitution to an assembly Ci-DCi, but which does not include a sensitive element. The processing of the demultiplexed signal corresponding to this reference path is used to determine the energy distribution in the spectrum from the light source, i.e. $B(\sigma)$ and to obtain better accuracy concerning the variations in transmission $Ti(\sigma,X)$ effectively relating to the various sensors.

In a variant, the sensitive elements of the various sensors Ci may be of the on/off type with their spectrum transmission varying abruptly about a given value of the physical magnitude X to be measured. The behavior of such a sensitive element may be represented in outline by the following equations:

$$Ti(\sigma,X) = 0 \text{ if } X \leq X_0$$

$$Ti(\sigma,X) = Ti(\sigma) \text{ if } X > X_0$$

Under these conditions, the spectrum information per se is of relatively little interest and the situation of the physical magnitude X relative to its predetermined value $X_0$ at which spectrum transmission in the sensitive element varies abruptly can be defined simply by evaluating the integrated transmission from the sensitive element.

Assuming that the light source 10 is of the homogeneous type, with a central wavelength $\lambda_0$ and of spectrum width $\Delta\lambda$, the useful signal is written as follows:

$$BTi(D - \Delta i) = \cos 2\pi \frac{D - \Delta i}{\lambda_0} \cdot \frac{\sin[\pi(D - \Delta i)/f\lambda_0]}{\pi(D - \Delta i)/f\lambda_0} \cdot BT_0$$

where: $f = \lambda_0/\Delta\lambda$

Simple $2\pi$ phase modulation by the tuning position $\Delta i$ suffices to evaluate the amplitude $BT_0$ of the useful signal and thus to deduce whether the sensitive element of the sensor is in a spectrum transmission state corresponding to a value of $X \leq X_0$ or in a spectrum transmission state corresponding to a value of $X > X_0$. As before, it may be advantageous to use a reference path which does not include any sensitive elements insofar as that makes it possible to monitor the transmission of the various sensors permanently and thus to avoid problems due to operating drift in the light source.

Figure 4:
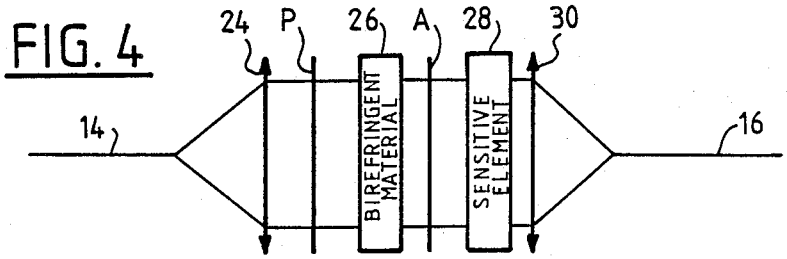
FIG. 4 is a diagram of an embodiment of a sensor in accordance with the invention.

FIG. 4 shows a preferred embodiment of the sensorencoding device assembly in accordance with the invention.

The end of the optical fiber 14 connecting the light source 10 to the sensor is placed at the focus of collimator optics 24 which provides a beam of parallel light applied to a polarizer P. The polarizer is followed by a plate 26 of uniaxial birefringent material which is cut parallel to its axis, then by an analyzer A, and then by the sensitive element 28 of the sensor whose spectral transmission varies at a function of the physical magnitude X to be measured. The light transmitted by this assembly is picked up by outlet optics 30 having a focus at which the end of the optical fiber 16 connected to the optical fiber 18 of the demodulation system 20 is placed. The plate 26 is characterized by a slow axis of index nL and a fast axis of index nR. The polarization direction is at an angle of 45° with the slow axis and the polarizer P and analyzer A assembly is disposed in a crossed or in a parallel configuration. Because of the interference between the two polarization states of the light, the flux transmitted by this sensor and encoding device assembly manifests periodic or quasi-periodic spectrum modulation as a frequency equal to the path length difference provided thereby, providing said path length difference $\Delta$ is greater than the coherence length of the light source 10, with $\Delta$ being given by the equation:

$$\Delta = e(nL - nR) = e.\Delta n(\sigma)$$

where: $e$ = the thickness of the plate 26.

This path length difference depends to a certain extent on spectrum, such that it is advantageous in the demodulation device to use a birefringent interferometer having the same constitution and having a similar spectrum dependency so as to compensate the effects thereof differentially. Such compensation is particularly useful when the light source used provides a wide spectrum (eg., a filament lamp).

The birefringent interferometer used for demodulating information may be a scanning interferometer (e.g., of the Bravais type) or a static interferometer (e.g., of the Babinet or Wollaston type). If a scanning interferometer is used, the useful signal is recorded by means of a single photoelectric detector depending on the displacement of a moving element suitable for continuously varying the path length difference in the interferometer. If a static interferometer is used, then the useful signal relating to each sensor is recorded by means of a multipoint detector such as a strip of charged transfer CCD diodes with the path length difference in the interferometer field being obtained without displacement of a moving path.

Figure 5:
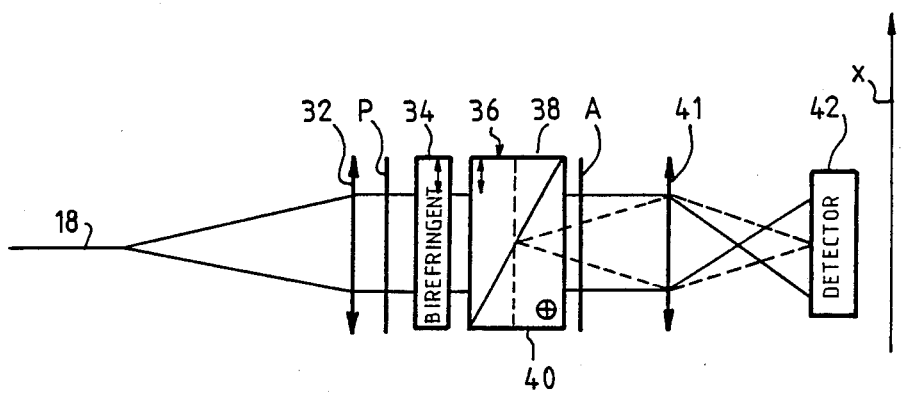
FIG. 5 is a diagram of an embodiment of an essential portion of spectrum analyzer means in accordance with the invention.

A preferred embodiment of the demodulation interferometer is shown in FIG. 5.

In this figure, the end of the optical fiber 18 is placed at the focus of collimator optics 32 to provide a parallel beam of light which is applied to a polarizer P. This polarizer is followed by a plate 34 of birefringent material which is identical in constitution to FIG. 4 plate 26. The plate 34 of birefringent material is followed by a Wollaston prism 36 constituted by two elementary birefringent prisms 38 and 40 which are stuck together along a face which slopes relative to the optical axis of the system and which are disposed in crossed manner with the slow axis of elementary prism 38 coinciding with the fast axis of elementary prism 40. At the center of the field (on the optical axis of the system) the two prisms have the same thickness. The Wollaston prism 36 is followed by an analyzer A which is associated with outlet optics 41 forming an image of the interference fringe field on a multipoint linear detector 42, for example of the CCD type. The polarizer P and analyzer A assembly has a crossed or a parallel configuration, and the direction of polarization is at an angle of 45° with the neutral axes of the birefringent plate 34.

Under these conditions, the path length difference D due to the demodulation system 20 varies linearly along a privileged optical direction x which is perpendicular to the optical axis, and along which the photosensitive elements of the multipoint detector 42 are aligned.

In practice, each birefringent plate 34 of the demodulation system corresponding to the birefringent plate 26 of one of the sensor and encoding device assemblies is carried by a disk mounted to rotate about an axis parallel to the optical axis of the modulation system and associated with drive means for rotating the disk so as to bring the various birefringent plates onto the optical axis of the system in succession, thereby demultiplexing the light signals transmitted by the reception optical fiber 18.

Further, the sensors used in the system in accordance with the invention may include elements which are sensitive to a first physical magnitude X to be measured, e.g. concentration in a binary mixture, while the modulation frequency characteristic of each sensor may itself vary as a function of some other physical magnitude Y, e.g. temperature. In this case, the demodulation, detection, and processing means used in the invention serve to give access simultaneously to the values of both physical magnitudes, providing:

the position of the lateral response $+\Delta$ in the demodulated signal is suitable for quantifying the value of the modulation frequency used for encoding (and thus for obtaining the value of physical magnitude Y);

the spectrum transmission of the sensitive element of the sensor (and thus the value of the magnitude X) can be determined from the demodulated signal as recorded about the path length difference $+\Delta$, after appropriate processing (removal of the zero frequency background and inverse Fourier transform).

Further, if the spectral transmission of the sensitive element of the sensor is a function of both physical magnitudes X and Y, the ability to measure the second physical magnitude Y independently makes it possible to avoid the effects of the spectral transmission being dependent on Y and thus obtain the value of physical magnitude X exactly.

I claim:

1. An optoelectronic method of remotely detecting physical magnitudes by means of sensors C1, C2, ..., Ci each including a sensitive element (28) whose spectral transmission varies as a function of a physical magnitude X to be measured, the sensors being illuminated by an incoherent light beam, and transmitting light signals to spectrum analyzer means (20, 22), the method being characterized in encoding the signals from each sensor Ci by superposing periodic or quasi-periodic modulation of its spectrum at a frequency characteristic of the sensor under consideration onto the light transmitted by the sensitive element of each sensor, in transmitting the signals modulated in this way via an optical fiber (18) to the said spectrum analyzer means (20, 22), in decoding or demultiplexing the signals by performing the Fourier transform optically in order to isolate the signal relating to each sensor, and then in processing this signal in order to obtain the value of the corresponding physical magnitude X.

2. A method according to claim 1, characterized in that the spectrum modulation encoding is performed in each sensor by means of a two-wave interferometer DCi comprising, for example, a birefringent plate (26) of determined constitution which is associated with the sensitive element (28) of the sensor, with demultiplexing being provided by means of a two-wave interferometer (20) comprising, for example, a birefringent plate (38) identical to the plate (26) of the sensor.

3. A method according to claim 1 or 2, characterized in that the signal resulting from the Fourier transform is recorded for each sensor, and in that a mathematical operation of the inverse Fourier transform type is performed thereon by digital means.

4. A method according to claim 3, characterized in that the spectrum modulation frequency of a sensor varies as a function of a second physical magnitude different from that which acts on the sensitive element of the sensor, with the signal as demultiplexed by the Fourier transform making it possible to gain access simultaneously to the values of both of these magnitudes.

5. A method according to claim 1 or 2, characterized in that the sensitive elements (28) of the sensors operate in on/off mode about a predetermined value of the corresponding physical magnitude, and in that the apparent intensity of the demultiplexed signal from each sensor is recorded in order to deduce the state of the physical magnitude relative to its predetermined value.

6. An optoelectronic system for remote detection of physical magnitudes, the system comprising a source (10) of incoherent light connected by optical fiber (12, 14) to sensors C1, C2, ..., Ci each including a sensitive element (28) whose spectral transmission varies as a function of a physical magnitude to be measured, said sensors being connected by optical fiber (16, 18) to spectrum analyzer means, the system being characterized in that each sensor includes spectrum modulation encoding means DC1, DC2, ..., DCi performing periodic or quasi-periodic modulation of the light transmitted by the sensitive element at a frequency which is characteristic of the sensor in question, each sensor being connected to the spectrum analyzer means (20, 22) by an optical fiber (18) which is common to all of the sensors, and in that the spectrum analyzer means comprise a two-wave interferometer (20) optically performing a Fourier transform on the signals received from the sensors in order to distinguish the signal from each sensor by virtue of its characteristic frequency, the system also including detector and processor means (22) for detecting the demultiplexed signals and for processing these signals in order to deduce the values of the detected physical magnitudes.

7. A system according to claim 6, characterized in that each spectrum modulation encoding means DCi is a two-wave interferometer suitable for introducing a path length difference between the two waves which is characteristic of the corresponding sensor.

8. A system according to claim 6 or 7, characterized in that each spectrum modulation encoding means DCi includes a birefringent plate (26) of determined constitution placed between crossed or parallel polarizers P,A in the immediate vicinity of the sensitive element (28) of the sensor.

9. A system according to claim 8, characterized in that the demultiplexing interferometer (20) includes a set of birefringent plates (34) each of which is identical to the birefringent plate (26) of a corresponding one of the sensors, together with means for bringing these plates one by one onto the optical axis of the interferometer (20).

10. A device according to claim 6, characterized in that the detector means comprise means (30) for recording all of the useful demultiplexed signal relating to each sensor, and in that the processor means comprise means for digitally performing an inverse Fourier transform applied to the recorded signal.

11. A system according to claim 10, characterized in that the spectrum modulation encoding means DCi is sensitive to a second physical magnitude different from that acting on the sensitive element (28) of the sensor, and in that the said processor means are capable of simultaneously determining the values of both of these magnitudes.

12. A system according to claim 6, characterized in that the sensitive elements (28) of the sensors are of the type operating in on/off mode about a predetermined value of the corresponding physical magnitude, and in that the detector means (22) include means for recording the apparent intensity of the demultiplexed signal relating to each sensor.

* * * * *